United States Patent [19]

Ellis

[11] 4,421,216
[45] Dec. 20, 1983

[54] HOUSING FOR VISCOUS FLUID COUPLING DEVICE

[75] Inventor: Norman Ellis, Huddersfield, England

[73] Assignee: Holset Engineering Company Limited, Huddersfield, England

[21] Appl. No.: 257,079

[22] Filed: Apr. 24, 1981

[30] Foreign Application Priority Data

May 3, 1980 [GB] United Kingdom ............... 8014906

[51] Int. Cl.³ ...................... F16D 35/00; F16D 43/25
[52] U.S. Cl. ................................ 192/58 B; 192/82 T
[58] Field of Search ........................... 192/58 B, 82 T

[56] References Cited

U.S. PATENT DOCUMENTS 3,983,981 10/1976 Snodgrass ...................... 192/58 B
4,061,218 12/1977 Tinholt .......................... 192/58 B
4,185,726 1/1980 Rohrer .......................... 192/58 B Primary Examiner—Allan D. Herrmann
Attorney, Agent, or Firm—Gary M. Gron; Robert T. Ruff

[57] ABSTRACT

The disclosure illustrates an air temperature sensing viscous fluid fan drive having an inexpensively manufactured housing which defines, in part, an annular working fluid chamber for a disk connected to an input shaft. The housing comprises a spider of sintered steel having a hub which receives a bearing for journaling the shaft. A series of integral radial arms have bosses at their tips for accurately mounting a fan. A ferrous metal disk is welded to the spider to form one wall of the working fluid chamber, the other of which is defined by an aluminum cover assembly. The ferrous housing maintains concentricity of the fan and housing relative to the input shaft irrespective of changes in temperature.

9 Claims, 6 Drawing Figures

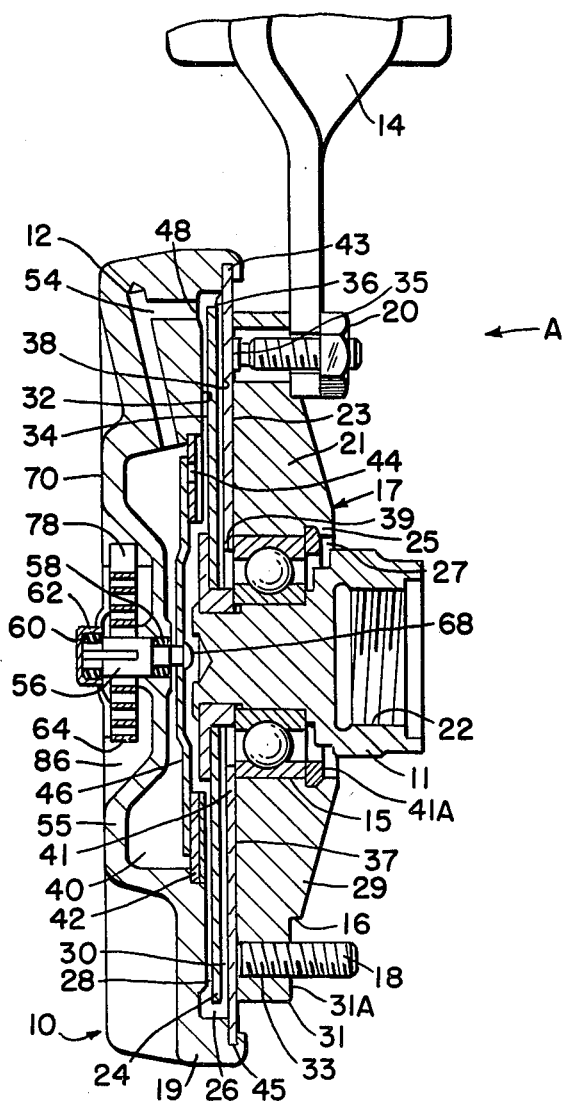

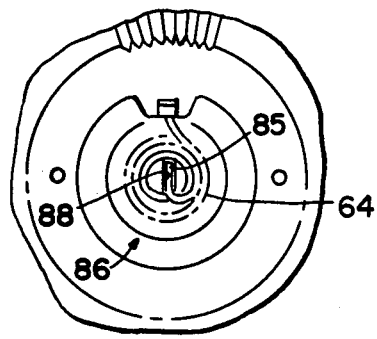
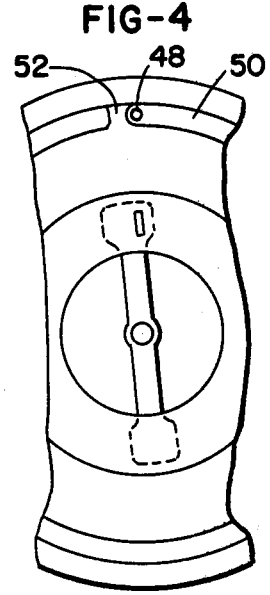
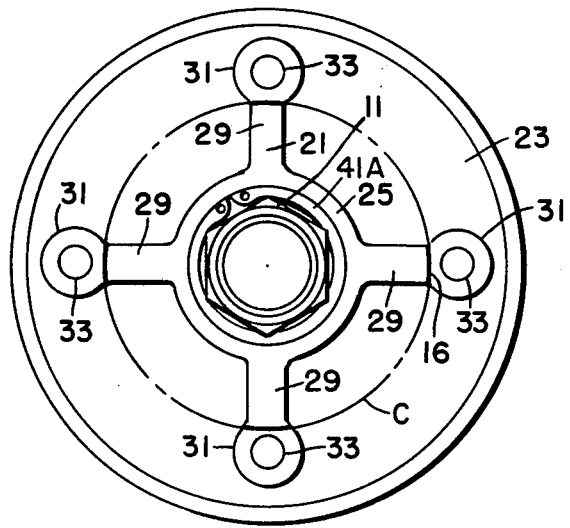

HOUSING FOR VISCOUS FLUID COUPLING DEVICE

The present invention relates to torque transmitting viscous shear fluid couplings and in particular to the housings of such couplings.

Such couplings are well known and their construction and operation have been described in numerous patents. The couplings may be simple torque limiting devices as described in U.S. Pat. No. 2,948,248 in which torque is transmitted from a driving member to a driven member by means of a viscous fluid permanently located between opposed shear surfaces on each of the two members. Alternatively, they may be more complex devices which include temperature responsive controls whereby the viscous fluid is selectively positioned either between the opposed shear surfaces on the two members or in a reservoir area to leave the opposed shear surfaces free of fluid as a function of the temperature external to the coupling. The latter couplings afford a greater degree of control over the r.p.m. of the driven member. Typical of such couplings are those described in U.S. Pat. Nos. 3,055,473 and 4,054,193.

Generally, simple torque limiting couplings include a rotatable driving member and a driven member. The driving member may include a shaft portion adapted for attachment to a source of power, usually an accessory drive shaft of an internal combustion engine such as a water pump shaft, and a driving disc co-axially fixed for rotation with the shaft position. The driving disc is mounted for concentric rotation within a working chamber in the driven member. The driven member typically includes a housing part journalled by suitable bearing means for co-axial rotation about the shaft portion of the driving member and a cover part fixed co-axially to the housing part, the housing and cover parts together defining the working chamber.

In the more complex temperature responsive devices, the driven member additionally includes an internal separator plate to divide the driven member into a working chamber and a reservoir space and temperature responsive means for selectively directing the viscous fluid within the coupling either into the working chamber or into the reservoir space.

Heat is generated during operation in both types of coupling as a result of the shearing action on the viscous fluid therein. It is customary to make the housing part or alternatively both the housing and cover parts from suitably finned aluminum or other high heat conductivity light alloy die castings to dissipate the heat generated to the surrounding atmosphere and thus prevent overheating of the coupling. Problems are, however, inherent in the use of aluminum or light alloy die castings for such parts.

First, the high thermal expansion associated with such materials results in wide variations in the dimensions of the housing. Particularly troublesome is the location diameter for the ball or needle roller bearing by which the housing member is journalled on the driving shaft. In addition, the mounting points for a steel cooling fan of an internal combustion engine can present a problem. The complex shape of such housings also necessitates the use of expensive dies and tooling.

The above problems are solved in accordance with the present invention by a viscous shear fluid coupling which comprises a central shaft and an annular housing having a cover attached thereto to form a working fluid chamber in which the disk is positioned. The housing comprises a spider member of ferrous material including a hub with a central bore through which said shaft extends and a plurality of integral radially extending arms, each having an arcuate shoulder at the same radial distance from the axis of the housing for mounting a component. The housing further comprises a circular plate of ferrous material abutting one face of the arms for forming a portion of the working fluid chamber. The circular plate has a central opening concentric with and of a diameter less than the bore diameter for forming an abutment. A bearing means is positioned in the bore against the abutment for journaling the housing relative to the central shaft.

The above and other related features of the present invention will be apparent from a reading of the following description of the disclosure found in the accompanying drawings and the novelty thereof pointed out in the appended claims.

In the drawings:

FIG. 1 is a cross-sectional view of a viscous coupling device embodying the present invention;

FIG. 3 is a front elevation of the coupling of FIG. 1 with the bearing bracket removed;

FIG. 4 is a fragmentary view of one face of the working chamber in the direction of arrow A in FIG. 1; and FIG. 5 is an end view of the housing in the direction of arrow A.

Figure 1A:
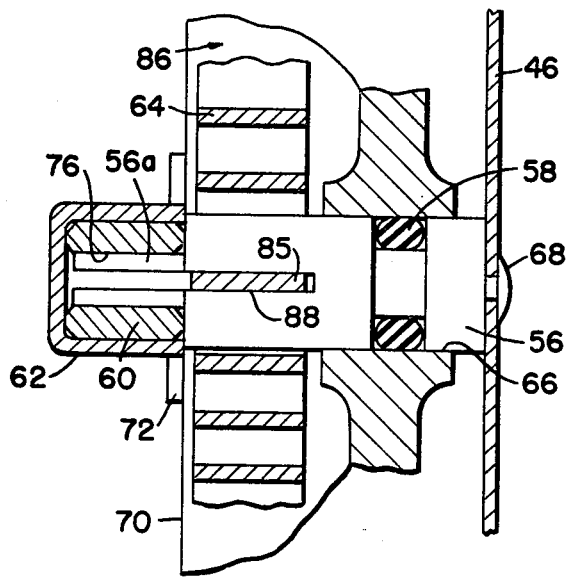
FIG. 1a is a portion of FIG. 1 to a larger scale.

Referring now to the drawings, FIG. 1 illustrates a torque transmitting viscous shear fluid coupling of the temperature responsive type generally designated 10 which contains a viscous working fluid (not shown) and includes a driving member 11 and a driven member 12, the driven member being journalled for co-axial rotation with the driving member by means of a bearing 15. It should be apparent to those skilled in the art that member 11 may be driven and member 12 connected to an input depending upon the particular needs of the application.

The driven member 12 includes a housing member generally designated 17 and a cover member 19. The housing member 17 comprises a ferrous material and preferably sintered steel spider member 21 and an annular steel disc member 23 fixed for co-axial rotation therewith. The spider member (see FIG. 5) has an annular hub 25 having a central bore 27 dimensioned to receive the bearing 15 and a plurality of radially extending arms 29 formed integrally with the hub 25. Each radial arm 29 includes at its outer end a boss 31 having a bore 33 extending in a direction parallel to the axis of housing member 17. The bosses 31 have a mounting surface 31A in a common plane extending at right angles relative to the axis of housing member 17. Mounting surfaces 31A each have an arcuate shoulder 16 whose outer facing surface lies in a common reference circle C as shown in FIG. 5. The shoulders 16 function as a pilot to locate the fan assembly 14 or other driven device co-axially with the driving member 11.

The fan assembly 14 is fixed by means of studs 18 and nuts 20 to the driven member 12 against mounting surfaces 31A. The studs 18 are fixed to the annular disc member 23 at 35 for example by projection welding, each stud passing through a respective bore 33 in an arm of the spider member 29. The annular disc member 23 and the spider member 21 may similarly be fixed to each other by projection welding through the arms as at 37.

Alternatively, the studs 18 may be fixed to the housing member 17 by providing the inner ends of the bores 33 with a thread 33A and by providing a corresponding thread on the inner ends of the studs 18 as shown in the lower portion of FIG. 1. The annular disc member 23 has a circular opening 39 smaller in diameter than the diameter of bore 27 thereby forming an abutment 41 for axial location of the driven member 12 against the bearing 15. A clip 41A received in bore 27 holds the outer race of bearing 15 against abutment 41. The outer diameter 43 of the annular disc member is greater than the radial dimension of the tips of arms 29. The annular cover member 19 has a lip 45 which is rolled over the outer diameter 45 of the annular disc member 23 as illustrated in FIG. 1 but other means such as screws (not shown) may also be used.

The driving member 11 comprises a central shaft with a threaded bore 22 for connection to a source of rotational energy (not shown). It is usual for the shaft to be formed from a ferrous material. A drive disc 24 which forms part of the driving member 11, by being fixed on the shift, is enclosed within a working chamber 26 formed as part of the driven member 12 and defining shear spaces 28 and 30 between the opposing faces 32, 34 and 36, 38 of the working chamber 26 and drive disc 24.

Figure 2:
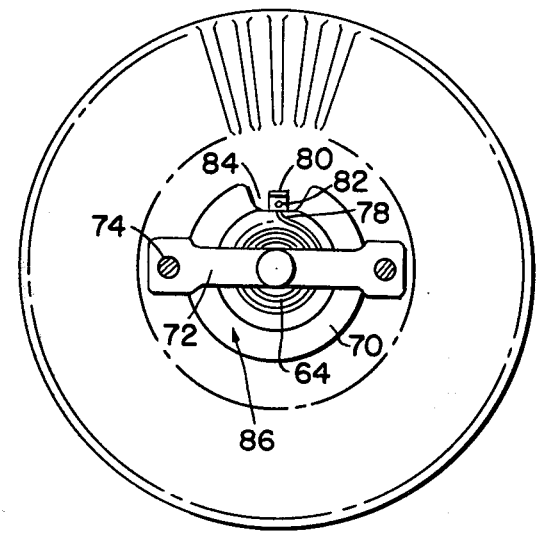
FIG. 2 is a front elevation of the coupling of FIG. 1.

The working chamber 26 is separated from a reservoir 40 by means of a valve plate 42 containing a valve port 44. A rotary valve member 46 is provided to open or close the valve port 44. Adjacent to the periphery of the drive disc 24 there is provided an outlet port 48 in the wall 32 of the working chamber. Passages 54 extend from port 48 to the reservoir 40. The outlet port 48 is provided with a scoop member 52 (FIG. 4) formed by a blocked groove 50 formed in the face 32 of the working chamber 26. The wall 55 of the cover member 19 defines the front wall of the reservoir and includes central bore 66 through which a valve shaft 56 extends. As shown most clearly in FIG. 1a, the valve shaft is attached rigidly to the valve arm for co-rotation by rivetting or staking at 68. A suitable seal 58 is provided to prevent leakage of fluid from the reservoir 40. A bracket member 72 (FIG. 2) is fixed to the front face 70 of the cover member 19 by means of screws or other suitable fastening means such as rivets at 74. A cup 62 in the center of bracket 72 receives a bearing 60 having an inner bore 76 for supporting and journalling the outboard end 56a of the valve shaft 56.

Angular rotation of the valve member 46 to open or close the valve port 44 is controlled by a temperature responsive bi-metal coil 64 located in a recess 86 in the front wall of the coupling driven member 12 (FIG. 3). The bi-metal coil 64 includes a first straight tang 78 which is fixed resiliently to the cover member 19 by means of an elastomeric sleeve 82 fitted tightly over the tang 78, the combined tang and sleeve being an interference fit in a slot 80 formed in a boss 84 within the recess 86. The slot 80 may be conveniently cast in the boss 84 as any casting draft angle can be readily accommodated by the elastomeric sleeve 82. The bi-metal coil 64 further includes a second straight tang 85 (FIG. 3) which is fitted closely into a slot 88 in the valve shaft 56 to impart rotational movement thereto in response to changes in temperature ambient to the bi-metal coil.

In operation, the driving member 11 is driven by means of an accessory drive shaft of an internal combustion engine. Shear resistance of the viscous fluid in the working chamber 26 causes the driven member 12 to rotate at an r.p.m. that is somewhat lower than the r.p.m. of the driven member. By virtue of the difference in r.p.m. between the driving disc 24 and the driven member 12, viscous fluid is gathered by the scoop 52 and pumped through ducts 54 into the reservoir 40. As long as the air temperature externally of the coupling is above a predetermined limit, the temperature responsive bi-metal coil 64 maintains the rotary valve member 46 in a position in which the valve port 44 remains open. Fluid from the reservoir 40 therefore passes through the valve port 44 into the working chamber 26 whereby sufficient fluid is maintained within the working spaces 28 and 30 to establish a maximum r.p.m. of the driven member. When the air temperature externally of the coupling drops below a predetermined limit, the temperature responsive bi-metal coil 64 moves the rotary valve member 46 into a position in which the valve port 44 is closed thereby preventing fluid flowing from the reservoir 40 to the working chamber 26. The scoop 52 however continues to pass fluid from the working chamber 26 thereby emptying the working chamber and shear spaces 28 and 30 of viscous fluid and hence reducing the degree of drive between the driving member 12 and driven member 11. The r.p.m. of the driven member then falls until it is substantially free-wheeling around the driving member with very little drive being transmitted. When the temperature again rises, the temperature responsive bi-metal coil 64 moves the valve member 46 into a position in which the valve port 44 is open thereby allowing fluid to pass from the reservoir 40 to the working chamber 26 and shear spaces 28, 30. The amount of fluid in the shear spaces 28, 30 gradually increases until the maximum drive condition is re-established and the r.p.m. of the driven member rises to a maximum.

The coefficient of expansion for the housing member 17 is approximately the same as that for the bearing 15 and the fan assembly 14 which are usually formed from some form of ferrous based metal. As a result, the thermal growth of the parts is uniform, thereby insuring the same fit and dimensional relationship irrespective of temperature variations. If the cover member 19 is made from aluminum to dissipate heat, any relative growth at the perifery does not affect the critical dimensions and clearances of the rotor and housing.

The housing member has a straightforward shape to permit inexpensive costing or sintering. The corresponding disk 23 may be stamped thus enabling further reductions in manufacturing costs.

While a preferred embodiment of the present invention has been described, it should be apparent to those skilled in the art that other forms may be practiced without departing from the spirit and scope thereof.

Having thus disclosed the invention what is novel and desired to be secured by Letters Patent of the United States is:

1. A viscous shear fluid coupling comprising:
a central shaft having a disk connected thereto;
an annular housing having a cover attached thereto and defining therebetween an annular working fluid chamber in which said disk is positioned, said housing comprising a spider member of ferrous material including a hub with a central bore through which said shaft extends and a plurality of integral radially extending arms, each having an arcuate shoulder at the same radial distance from the axis of said housing for mounting a component, said housing further comprising a circular plate of ferrous material abuting one face of the arms for forming a portion of said working fluid chamber, said circular plate having a central opening concentric with and of a diameter less than the bore diameter for forming an abutment; and bearing means positioned in said bore against said abutment for journaling said housing relative to said central shaft.

2. Apparatus as in claim 1 wherein said cover is formed from aluminum.

3. Apparatus as in claim 2 wherein:
said circular plate has an outer diameter greater than the radial dimension of the tips of said arms; and
wherein said aluminum cover has a periferal lip which is rolled over the outer diameter of said circular plate to secure said cover and plate.

4. Apparatus as in claim 1 wherein said circular plate is secured to said spider by welding to the arms.

5. Apparatus as in claim 1 further comprising:
a circular boss integral with each of said arms at the tips thereof, said boss being intercepted at its radially inner portion by said arcuate shoulder, the axial faces of said bosses connecting with the arcuate shoulders being in a common plane thereby providing a mounting for a component having a pilot circle in a central hub; and
fastening means extending through said bosses in a direction parallel to the axis of said housing for mounting said component against said bosses.

6. Apparatus as in claim 5 wherein said component has a series of holes aligned with said bosses and wherein:
said fastening means comprise threaded studs extending out of said bosses and through said holes and nuts threaded onto said shaft for holding said component against said bosses.

7. Apparatus as in claim 6 wherein said studs are welded to said circular plate.

8. Apparatus as in claim 6 wherein said studs are threaded into said bosses.

9. Apparatus as in claim 1 further comprising a retaining clip received in a groove in said bore for holding said bearing means against said abutment.

* * * * *